United States Patent
Abe et al.

(10) Patent No.: US 7,043,350 B2
(45) Date of Patent: May 9, 2006

(54) FUEL INJECTION CONTROL APPARATUS FOR INTERNAL COMBUSTION ENGINE AND METHOD THEREOF, AND FUEL INJECTION VALVE

(75) Inventors: Noriyuki Abe, Atsugi (JP); Junichi Furuya, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/935,399

(22) Filed: Sep. 8, 2004

(65) Prior Publication Data

US 2005/0060086 A1    Mar. 17, 2005

(30) Foreign Application Priority Data

Sep. 12, 2003   (JP)   ............................. 2003-321500

(51) Int. Cl.
   *G06F 19/00*   (2006.01)
   *F02D 41/04*   (2006.01)
   *F02M 61/18*   (2006.01)

(52) U.S. Cl. ...................... 701/103; 701/104; 123/478; 239/533.12

(58) Field of Classification Search ........ 123/306–590; 239/533.4, 533.8, 533.12, 533.13, 585.2, 239/585.4; 701/104, 103
See application file for complete search history.

(56) References Cited

U.S. PATENT DOCUMENTS

| 5,540,388 | A | * | 7/1996 | Sasao | ...................... 239/585.4 |
| 6,092,743 | A | * | 7/2000 | Shibata et al. | ......... 239/533.12 |
| 6,644,269 | B1 | * | 11/2003 | Kato et al. | ............... 239/533.8 |
| 2005/0056710 | A1 | * | 3/2005 | Sekiya et al. | .......... 239/533.12 |

FOREIGN PATENT DOCUMENTS

| JP | 11-182384 A | * | 7/1999 |
| JP | 201-153003 A | * | 6/2001 |
| JP | 2001-295738 A |   | 10/2001 |

* cited by examiner

*Primary Examiner*—Willis R. Wolfe, Jr.
(74) *Attorney, Agent, or Firm*—Foley & Lardner LLP

(57) ABSTRACT

An angle of spray of a fuel injection valve is narrowed when a temperature of an internal combustion engine is low, whereas the angle of spray of the fuel injection valve is widened in a low and intermediate load region where the temperature of the internal combustion engine is high. The angle of spray of the fuel injection valve is narrowed and also a spray condition is controlled so that the fuel spray comes unevenly in contact with an exhaust side portion of a valve head of an intake valve, in a high load region where the temperature of the internal combustion engine is high.

28 Claims, 8 Drawing Sheets

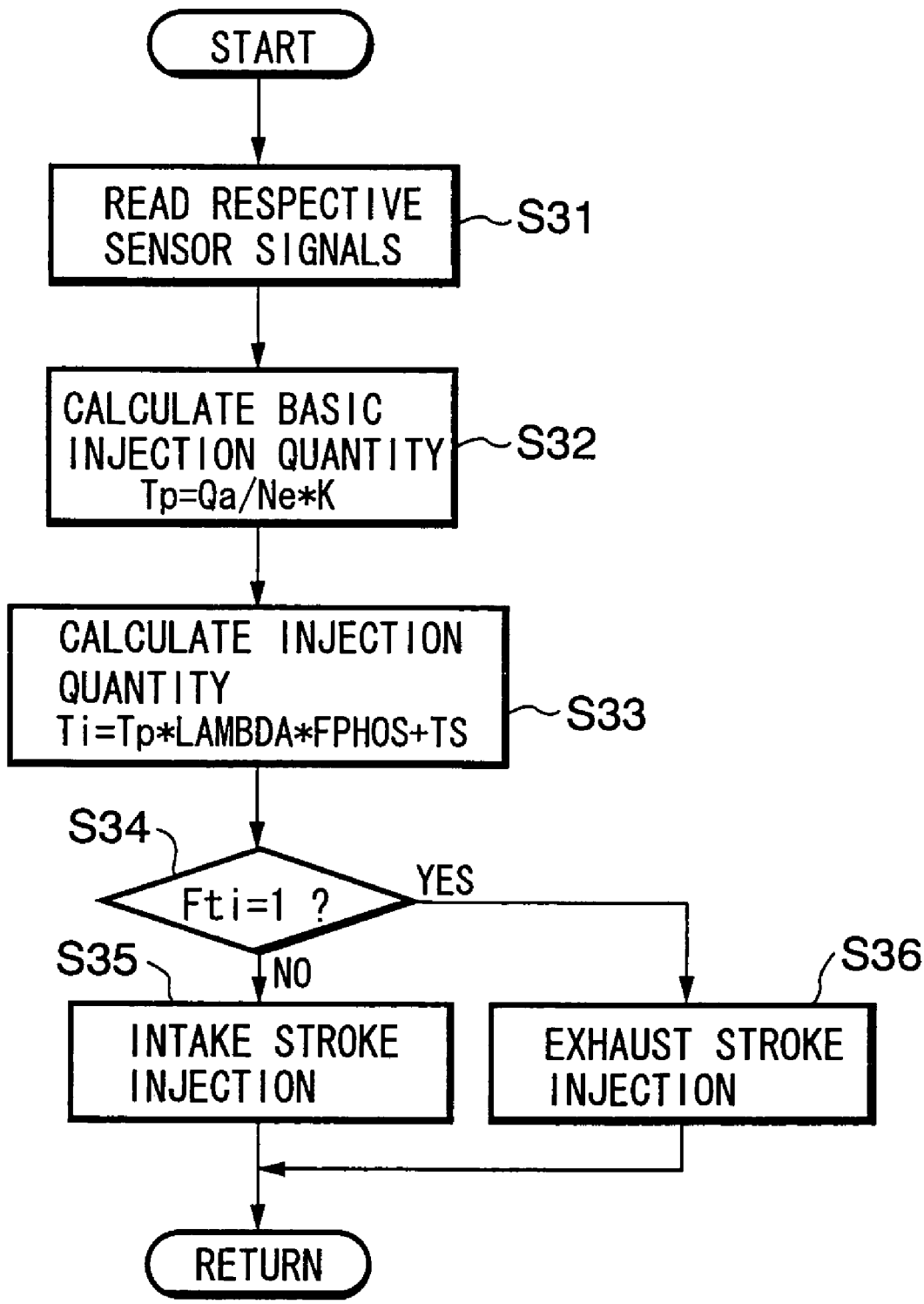

FUEL INJECTION CONTROL APPARATUS FOR INTERNAL COMBUSTION ENGINE AND METHOD THEREOF, AND FUEL INJECTION VALVE

FIELD OF THE INVENTION

The present invention relates to a fuel injection control apparatus for an internal combustion engine and a method thereof, and a fuel injection valve. In particular, the present invention relates to a technology for changing a spray condition of fuel.

RELATED ART

Japanese Unexamined Patent Publication No. 2001-295738 discloses a technology in which an extended pipe is disposed on a tip end of a fuel injection valve, and the injection/shutoff of fuel is controlled by an open/close mechanism disposed on a tip end of the extended pipe.

Further, in the above Publication, the fuel is injected toward the center of a valve head of an intake valve, to prevent the adhesion of fuel to a wall surface of an intake port.

However, in the convention technique, a spray shape and an injection direction are fixed irrespective of engine operating conditions.

Therefore, there is caused a problem in that a fuel spray condition cannot be controlled to be optimum when an evaporation characteristic of fuel is changed depending on the engine operating conditions, such as, an engine temperature, an engine load or the like.

SUMMARY OF THE INVENTION

The present invention has an object to enable an optimum spray condition coping with changes in engine operating conditions, such as, an engine temperature, an engine load or the like.

In order to achieve the above object, according to the present invention, a spray condition of a fuel injection valve is changed based on operating conditions of an internal combustion engine.

The other objects and features of this invention will become understood from the following description with reference to the accompanying drawings.

BRIEF EXPLANATION OF THE DRAWINGS

FIG. 7 is a flowchart showing a sub-routine of the fuel injection control.

DESCRIPTION OF EMBODIMENTS

Figure 1:
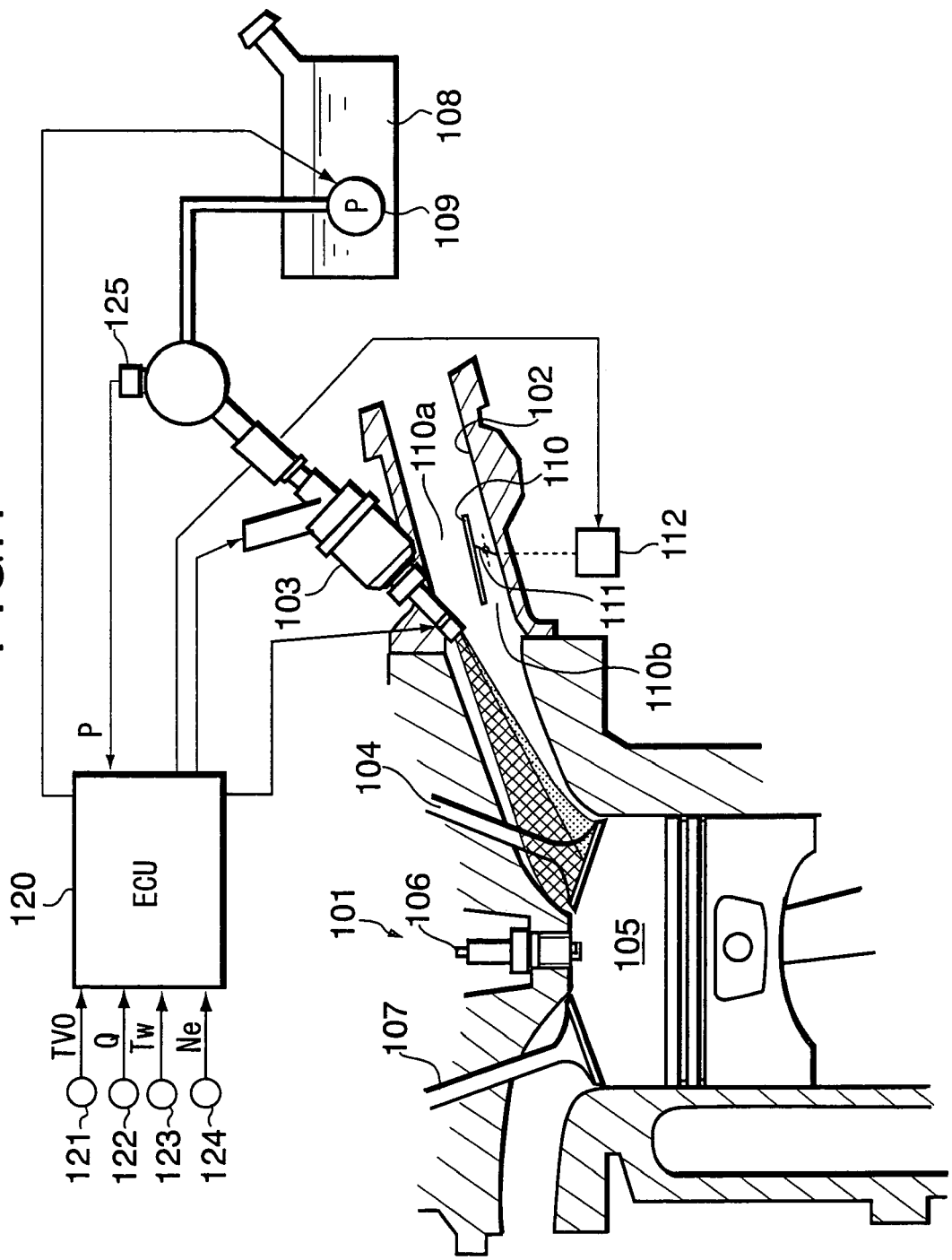
FIG. 1 is a diagram showing a system configuration of an internal combustion engine.

FIG. 1 is a diagram showing a system configuration of an internal combustion engine in an embodiment.

An internal combustion engine 101 shown in the figure is a gasoline engine.

A fuel injection valve 103 is disposed on an intake port 102 on the upstream side of an intake valve 104 of internal combustion engine 101.

When intake valve 104 is opened, fuel injected from fuel injection valve 103 and air, are sucked into a combustion chamber 105.

An air-fuel mixture within combustion chamber 105 is combusted with the spark ignition by an ignition plug 106.

A combusted exhaust gas within combustion chamber 105 is discharged via an exhaust valve 107.

Fuel injection valve 103 is opened, by lifting up a valve body with a magnetic suction force of an electromagnetic coil.

To fuel injection valve 103, the fuel (gasoline) within a fuel tank 108 is sent under pressure by a fuel pump 109.

A fuel supply pressure to fuel injection valve 103 is controlled to a target pressure, by controlling a discharge amount from fuel pump 109.

Further, a partition plate 110 horizontally separating intake port 102 in an axial direction of a cylinder, is disposed on a portion, which is on the upstream side of a nozzle hole portion of fuel injection valve 103, of intake port 102.

An upper side port 110a separated by partition plate 110 has an opening area wider than that of a lower side port 110b.

An intake air control valve 111 is disposed on lower port 110b.

Intake air control valve 111 is driven to open/close by an actuator 112.

An engine control unit (ECU) 120 incorporating therein a microcomputer controls fuel injection valve 103, ignition plug 106, fuel pump 109 and actuator 112, based on detection signals from various sensors.

As the various sensors, there are provided a throttle sensor 121 detecting an opening TVO of a throttle valve (not shown in the figure), an air flow meter 122 detecting an intake air flow amount Qa of internal combustion engine 101, a water temperature sensor 123 detecting a cooling water temperature Tw of internal combustion engine 101, a rotation sensor 124 detecting a rotation speed Ne of internal combustion engine 101 and a fuel pressure sensor 125 detecting a pressure of the fuel.

Figure 2:
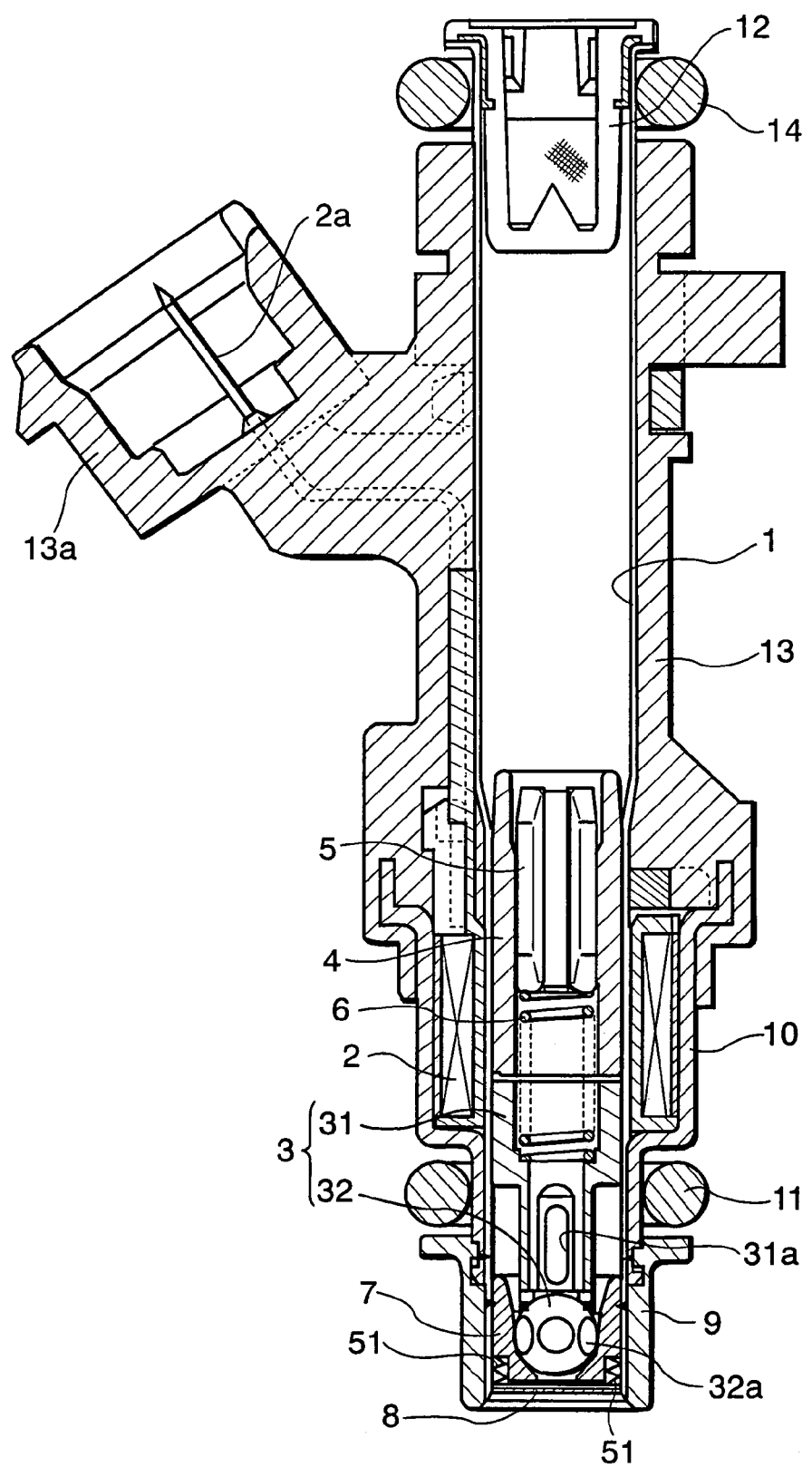
FIG. 2 is a cross section of a fuel injection valve provided with a mechanism displacing a nozzle plate.

Here, fuel injection valve 103 will be described in detail based on FIGS. 2 to 4.

A casing pipe 1 is formed of magnetic substance, and an electromagnetic coil 2 is fixed on the outer side of casing pipe 1.

Into casing pipe 1, a valve body 3 consisting of a cylindrical anchor 31 and a ball 32, which are welded together, is axially inserted in a slidable manner.

A fuel passing hole 31a is opened on a lower peripheral wall of anchor 31.

Further, a plurality of planes 32a is formed on the peripheral side of ball 32.

The fuel, which flows out of anchor 31 through fuel passing hole 31a, passes through a gap between plane 32a and an inner wall of a valve seat member 7, to flow to the tip end side of fuel injection valve 103.

Above valve body 3, a cylindrical spring housing 4 is fixed on an inner wall of casing pipe 1, having a predetermined gap with valve body 3.

A cylindrical stopper 5 is fixed in spring housing 4, and a return spring 6 is inserted under a compressed state, between a lower end of spring stopper 5 and a stepped portion of anchor 31.

Valve seat member 7 on which ball 32 of valve body 3 is seated, is coupled by welding to the inside of a lower end portion of casing pipe 1.

A nozzle plate 8 on which a plurality of nozzles 8*a* is opened, is disposed on the downstream side of valve seat member 7.

A cap member 9 is fixed on the outside of the lower end portion of casing pipe 1.

Further, a lower end portion of a coil cover 10 covering the outside of electromagnetic coil 2, is welded to casing pipe 1.

A sealing member 11 is inserted between an upper end flange portion of cap member 9 and a stepped portion of coil cover 10.

A fuel filter 12 is fixed on an upper end portion of casing pipe 1.

A resin casing 13 covers an area of from an upper end portion of coil cover 10 until the upper end portion of casing pipe 1, and an area of electromagnetic coil 2 except for an end portion of a lead 2*a*.

A sealing member 14 is inserted between an upper end face of resin casing 13 and an upper end flange face of casing pipe 1.

Resin casing 13 surrounds the end periphery of lead 2*a* of electromagnetic coil 2, to form a connector portion 13*a*.

Then, when electromagnetic coil 2 is not supplied with the power, valve body 3 is seated on valve seat member 7 by a resilient compression force of return spring 6, so that fuel injection valve 103 is closed.

On the other hand, when electromagnetic coil 2 is supplied with the power, valve body 3 is lifted up against the resilient compression force of return spring 6, to be separated from valve seat member 7, so that fuel injection valve 103 is opened.

Here, nozzle plate 8 is supported so as to be axially displaceable.

Figure 3:
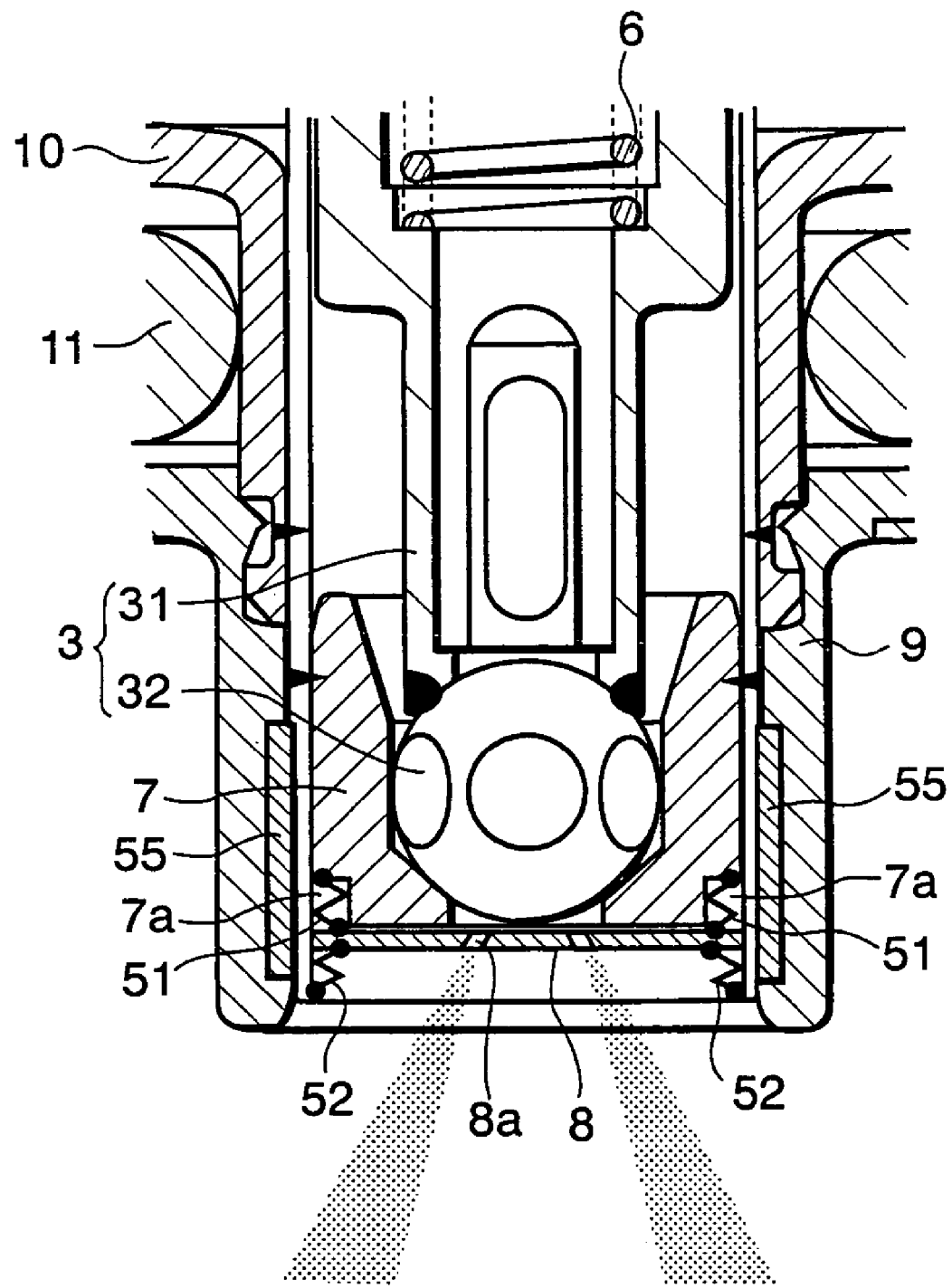
FIG. 3 is a partially enlarged diagram showing a state where an angle of spray of the fuel injection valve is narrow.
Figure 4:
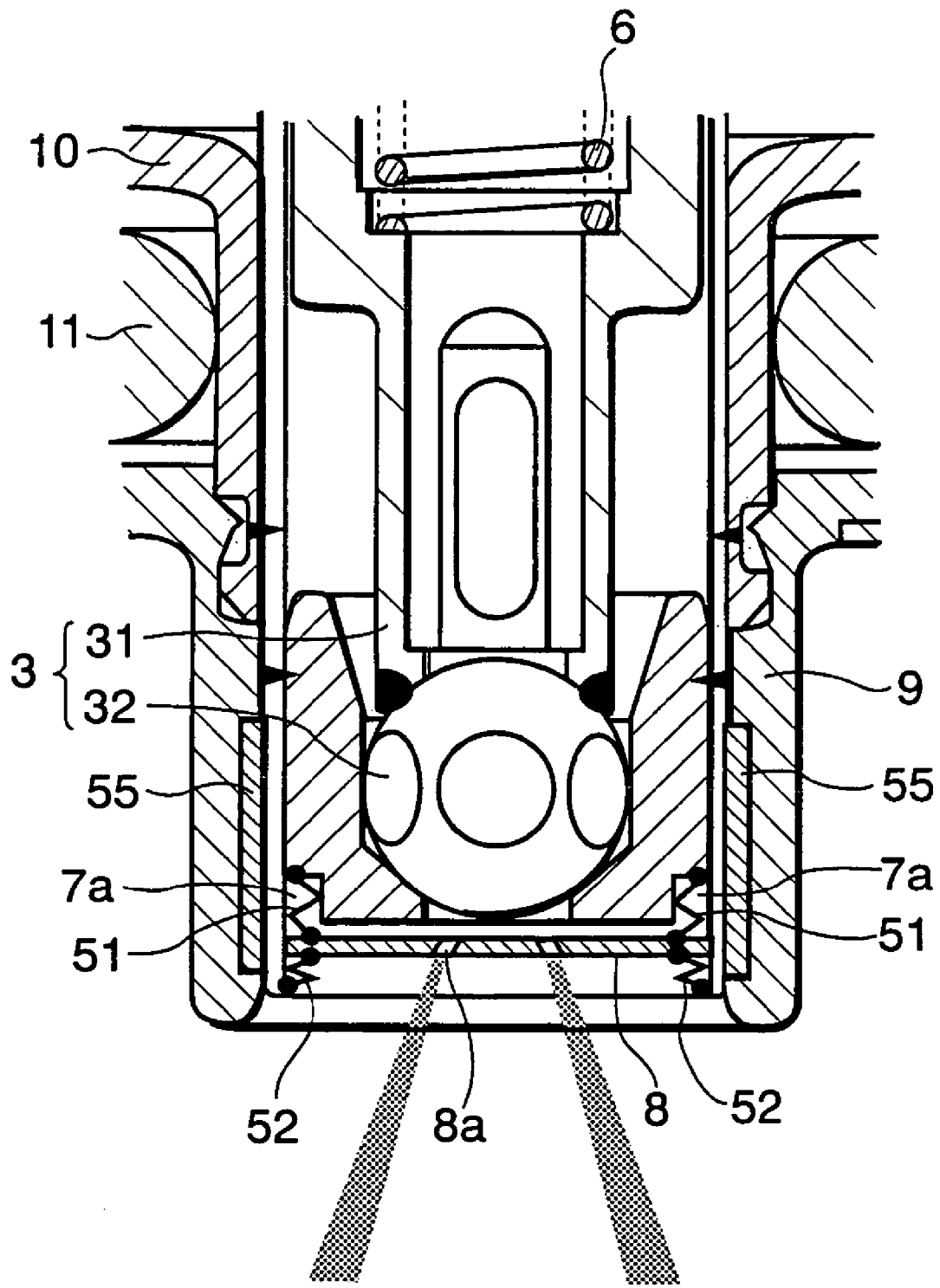
FIG. 4 is a partially enlarged diagram showing a state where the angle of spray of the fuel injection valve is wide.

As shown in FIG. 3 and FIG. 4, a deforming member 51 is accommodated within a notch portion 7*a* disposed on the lower end outer periphery of valve seat member 7.

One end of deforming member 51 is fixed on an end face of notch portion 7*a* and the other end thereof is fixed on an end face of nozzle plate 8.

Deforming member 51 is formed of shape-memory alloy whose shape is changed depending on a temperature.

When deforming member 51 is extended or contracted in an axial direction of fuel injection valve depending on the temperature, nozzle plate 8 is axially displaced while slidingly contacting an inner peripheral wall of casing pipe 1.

Accordingly, an interval between a lower end of valve seat member 7 and nozzle plate 8 is changed, according to the deformation of deforming member 51. As a result, the shape of a fuel passage between a valve seat portion of valve seat member 7 and nozzle plate 8 is correspondingly changed.

When the interval between the lower end of valve seat member 7 and nozzle plate 8 is changed, a relative angle between a fuel flow direction and nozzle hole 8*a* is changed, so that an angle of spray of the fuel is changed as shown in FIG. 3 and FIG. 4.

Further, a return spring 52 urging nozzle plate 8 toward a reference position shown in FIG. 3 is disposed between casing pipe 1 and nozzle plate 8.

Moreover, a heater 55 heating deforming member 51 is integrally disposed on the inside of cap member 9.

Thus, the power supply to heater 55 is controlled, so that the temperature of deforming member 51 can be controlled.

In the present embodiment, if heater 55 is turned OFF, valve seat member 7 and nozzle plate 8 are separated from each other and the angle of spray is made to be narrow, as shown in FIG. 4, whereas if heater 55 is turned ON, valve seat member 7 and nozzle plate 8 approach each other and the angle of spray is made to be wider, as shown in FIG. 3.

Figure 5:
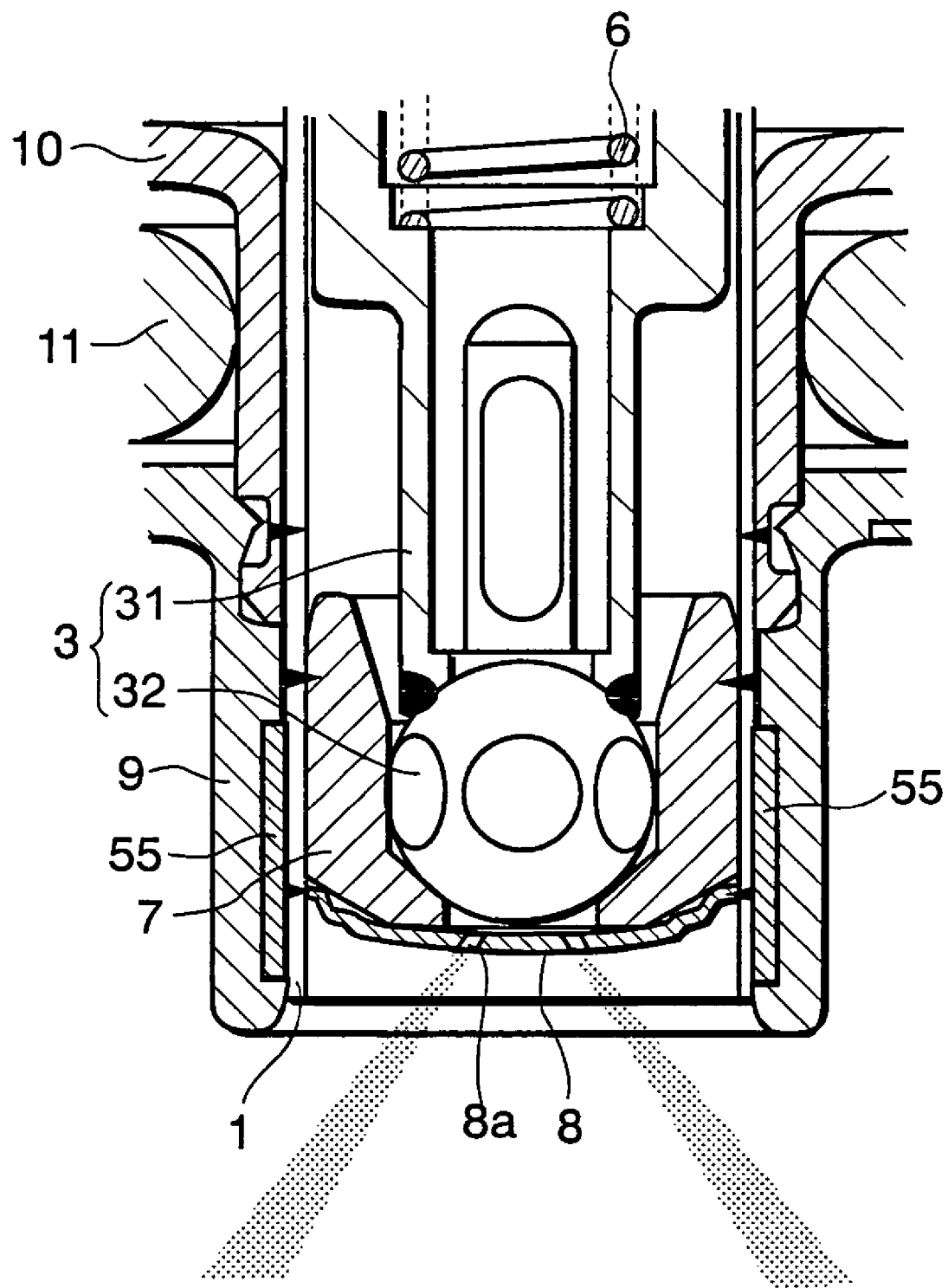
FIG. 5 is a cross section of a fuel injection valve provided with a thermally deforming nozzle plate.

FIG. 5 shows fuel injection valve 103 in which nozzle plate 8 is formed of shape-memory alloy.

In FIG. 5, the periphery of nozzle plate 8 formed of shape-memory alloy is connected to the inner peripheral wall of casing pipe 1 by welding.

Then, nozzle plate 8 is deformed depending on the temperature, so that a center portion of nozzle plate 8, on which nozzle holes 8*a* are opened, is axially displaced.

In fuel injection valve 103 shown in FIG. 5, if a temperature condition is changed by a power supply control to heater 55, nozzle plate 8 is deformed.

Then, if nozzle plate 8 is deformed, an interval between valve seat member 7 and the center portion of nozzle plate 8 is changed, and at the same time, the shape of nozzle hole 8*a* is changed, resulting in a change in the angle of spray.

Next, a fuel injection control by ECU 120 will be described in accordance with flowcharts of FIG. 6 and FIG. 7.

Figure 6A:
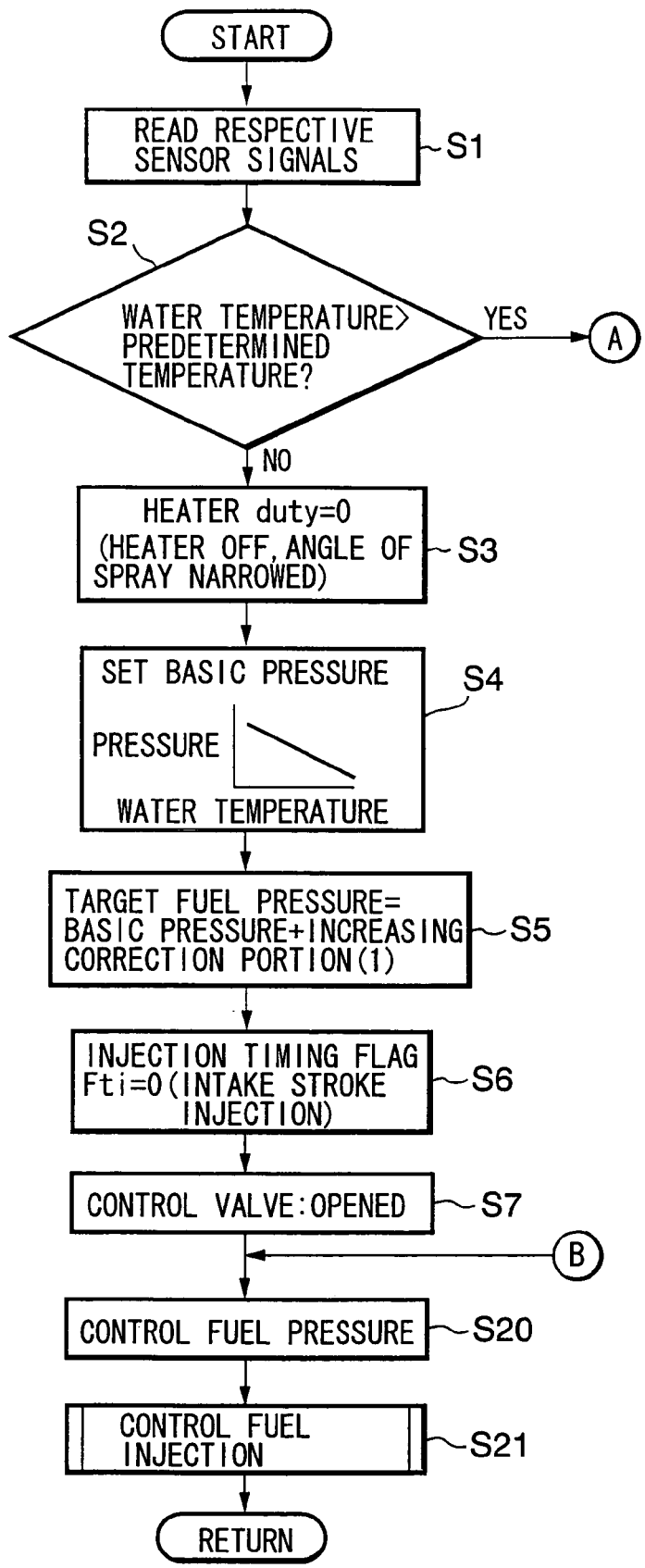
FIGS. 6A and 6B are flowcharts showing a main routine of a fuel injection control.
Figure 6B:
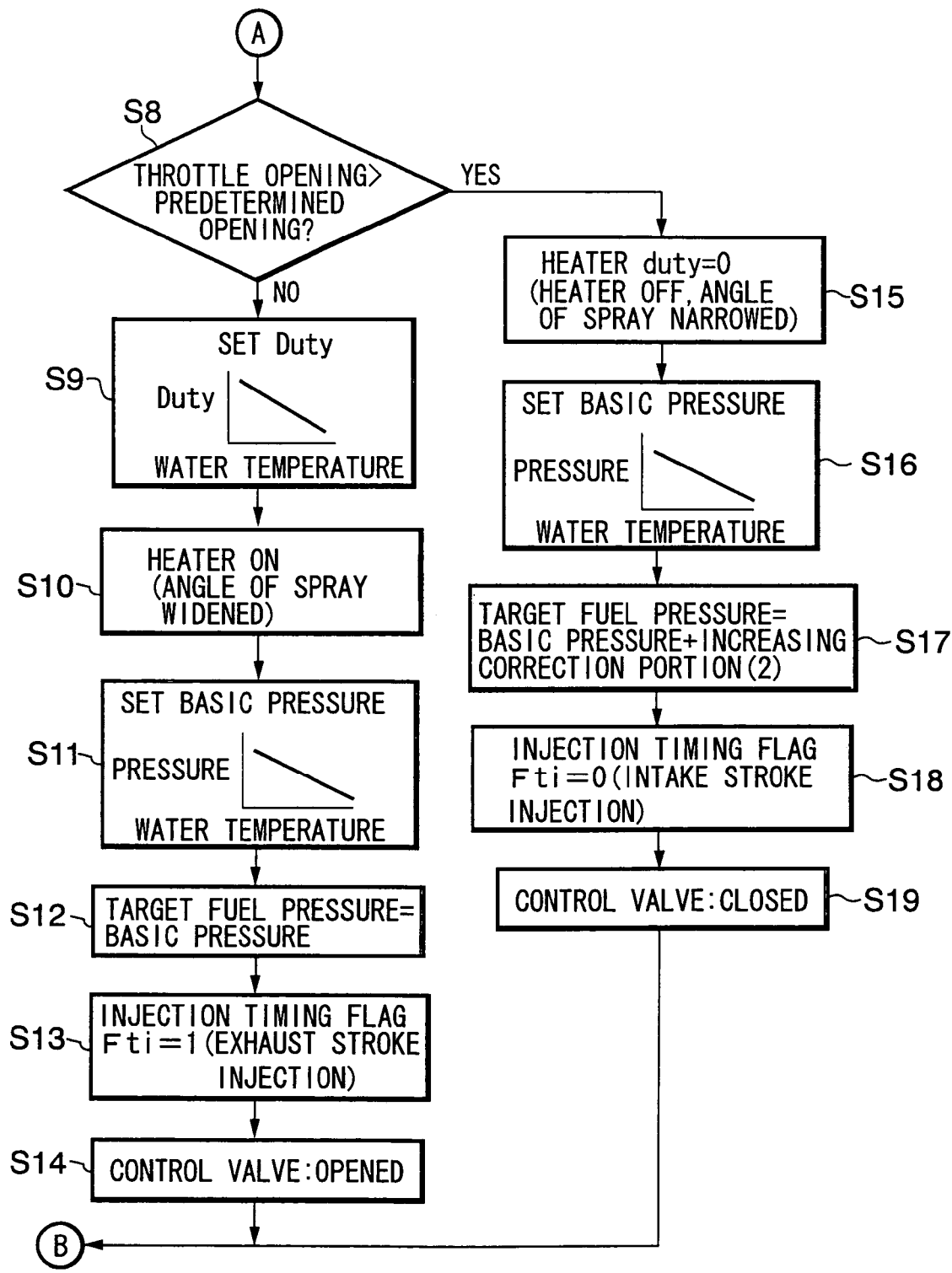

The flow chart in FIG. 6 shows a main routine of fuel injection control.

In step S1, the detection signals from the respective sensors are read.

In step S2, it is judged whether or not the cooling water temperature Tw representing an engine temperature exceeds a predetermined temperature.

The predetermined temperature is a value for distinguishing a state after warmed-up and a cooled-down state of internal combustion engine 101, and is set to a temperature of after the engine fully warmed-up or less.

If the cooling water temperature Tw is equal to or less than the predetermined temperature, control proceeds to step S3.

In step S3, a power supply control duty (ON time ratio) of heater 55 for controlling the angle of spray of fuel injection valve 103, is set to 0, to shut off the power supply to heater 55 thereby narrowing the angle of spray.

If the angle of spray of fuel injection valve 103 is set to be narrow, the fuel spray comes in contact with a center portion of a valve head of intake valve 104.

Further, if the angle of spray of fuel injection valve 103 is set to be narrow, since the adhesion of fuel to a wall surface of intake port 102 is avoided, it is possible to prevent the fuel from flowing in a liquid state on the wall surface of intake port 102 to be sucked into the cylinder.

Consequently, it is possible to improve the combustibility of internal combustion engine 101, thereby improving the emission performance and the fuel economy.

In step S4, a basic value of a target fuel pressure in a fuel pressure control is set to be higher as the cooling water temperature Tw at the time is lower.

In step S5, the basic value is added with a previously set increasing correction portion (1) for fuel atomization, to set a final target fuel pressure.

The fuel pressure is made to be high at the engine cooled-down time at which the fuel vaporization performance is lowered, so that the fuel is further atomized, thereby accelerating the vaporization.

In step S6, injection timing of the fuel is set in an intake stroke.

If the fuel is injected during the intake stroke, the injected fuel rides an intake air current. Thus, the liquid fuel is prevented from adhering to the wall surface of intake port 102.

In step S7, intake air control valve 111 is controlled to be in an opened state, so that the intake air flows over the entirety of intake port 102.

Accordingly, the fuel injected from fuel injection valve 103 rides the intake air current, to come in contact with the center portion of the valve head of intake valve 104.

In step S20, a discharge amount of fuel pump 109 is feedback controlled, in order to coincide an actual fuel pressure with the target fuel pressure.

In step S21, a fuel injection time and a fuel injection quantity by fuel injection valve 103 are controlled.

As described above, at the engine cooled-down time, the fuel pressure is increased to accelerate the atomization of fuel spray, and the angle of spray of fuel injection valve 103 is made to be narrow, to inject the fuel toward the center portion of the valve head of intake valve 104, and also the fuel spray is made to ride the intake air current by the injection during the intake stroke.

Thus, it is possible to prevent the fuel from flowing in the liquid state on the wall surface of intake port 102 to be sucked into the cylinder, thereby improving the emission performance at the engine cooled-down time.

If it is judged in step S2 that the cooling water temperature Tw exceeds the predetermined temperature, control proceeds to step S8.

In step S8, it is judged whether or not the throttle opening TVO representing an engine load exceeds the predetermined opening.

The predetermined opening is equivalent to a lower limit boundary of a high load region where the knocking becomes easy to occur.

Then, if a low and intermediate load region after the engine warmed-up is judged where the throttle opening TVO is equal to or less than the predetermined opening, control proceeds to step S9.

In step S9, the power supply control duty of heater 55 is set to be higher as the cooling water temperature Tw at the time is lower.

In step S10, the power is supplied to heater 55 based on the power supply control duty.

As described above, the power supply control duty is set based on the cooling water temperature Tw representing the temperature of nozzle plate 8 of fuel injection valve 103, to heat deforming member 51 to a fixed temperature.

Then, the temperature of deforming member 51 is made to be high, thereby widening the angle of spray.

When the angle of spray is made to be wider than that at the engine cooled-down time, the fuel spray is injected toward the entire of valve head of intake valve 104.

Here, since the temperatures of the wall surfaces of intake valve 104 and intake port 102 are sufficiently high, the fuel spray come in contact with the wall surfaces of intake valve 104 and intake port 102 no longer flow in the liquid state, so that the fuel is vaporized by the heat of the wall surfaces of intake valve 104 and intake port 102.

In step S11, the basic value of the target fuel pressure in the fuel pressure control is set to be higher as the cooling water temperature Tw at the time is lower.

In step S12, the basic value is set to the final target fuel pressure just as it is. This is because the vaporization acceleration can be sufficiently achieved even though the atomization is not promoted.

In step S13, the fuel injection timing is set in an exhaust stroke.

The fuel is injected in a condition where intake valve 104 is closed, so that the heat of intake valve 104 is positively utilized, to vaporize the fuel.

In step S14, intake air control valve 111 is controlled to be in the opened state, so that the intake air flows over the entirety of intake port 102.

As described above, at the time of low and intermediate load operation after the engine warmed-up, in order to achieve the vaporization acceleration by the heat of intake valve 104, the angle of spray is widened and the fuel injection is performed during the exhaust stroke, and at the same time, the increase setting of the fuel pressure for the fuel atomization is stopped.

Further, if it is judged in step S8 that the throttle opening TVO exceeds the predetermined opening, control proceeds to step S15.

In step S15, the power supply control duty of heater 55 is made to be 0, to turn heater 55 OFF, so that the angle of spray of fuel injection valve 103 is narrowed.

In step S16, the basic value of the target fuel pressure in the fuel pressure control is set to be higher as the cooling water temperature Tw at the time is lower.

In step S17, the basic value is added with a previously set increasing correction portion (2) for the high load operating time, to set the final target fuel pressure.

Note, the increasing correction portion (1) is larger than the increasing correction portion (2).

At the high load operating time, since the angle of spray is narrowed and also the intake stroke injection is performed as described later, the vaporization performance by the heat of intake valve 104 is lowered, compared with the low and intermediate load operating time. Therefore, the fuel pressure is made high, to achieve the fuel atomization.

In step S18, the injection timing is set in the intake stroke.

In step S19, intake air control valve 111 is controlled to close, so that the intake air unevenly flows on the upper side of intake passage 102.

In the intake stroke injection, the fuel spray travels riding the intake air current. However, since the intake air current biases the upper side, the fuel injected at the narrow injection angle comes unevenly in contact with an exhaust port side portion of the valve head of intake valve 104.

As a result, the cylinder temperature in the vicinity of exhaust valve 107 can be reduced, so that the ignition timing can be further advanced while preventing the occurrence of knocking, thereby improving the power of internal combustion engine 101.

The flowchart in FIG. 7 shows the details of the process content of step S21.

In step S31, the detection signals from the respective sensors are read.

In step S32, a basic fuel injection quantity Tp is calculated based on the intake air flow amount Qa, the engine rotation speed Ne and a constant K.

In step S33, the basic fuel injection quantity Tp is corrected with an air-fuel ratio feedback correction coefficient LAMBDA for coinciding an air-fuel ratio of air-fuel mixture with a target air-fuel ratio, a fuel pressure correction coefficient FPHOSE and a battery voltage correction portion Ts, to calculate a final injection quantity (injection pulse width) Ti.

In step S34, a flag indicating the setting of intake stroke injection or exhaust stroke injection is judged.

Then, if the intake stroke injection is requested, control proceeds to step S35, where an injection pulse signal of the injection pulse width Ti is output to fuel injection valve 103, in synchronism with the intake stroke of each cylinder.

Further, if the exhaust stroke injection is requested, control proceeds to step S36, where the injection pulse signal of the injection pulse width Ti is output to fuel injection valve 103, in synchronism with the exhaust stroke of each cylinder.

Note, in the above embodiment, the cooling water temperature has been detected as a parameter representing the engine temperature. However, a lubricating oil temperature or an intake port temperature can be detected as the parameter.

Further, the engine temperature can be estimated based on an elapsed time after the start of engine operation.

Moreover, the engine load can be judged based on an intake air amount, an intake negative pressure, the accelerator opening or the like, other than the throttle opening.

Furthermore, as means for atomizing the fuel spray, it is possible to use means for letting the fuel spray to collide with the air, to be atomized, other than the configuration for increasing the fuel pressure.

Still further, at the engine low temperature time, the fuel spray can be made to come in contact with circularly the center portion of the valve head of intake valve 104, while in the low and intermediate load operation time at the high temperature time (after the engine warmed-up), the fuel spray can be made to come in contact with an outer side ring portion surrounding the center portion.

The entire contents of Japanese Patent Application No. 2003-321500 filed on Sep. 12, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What is claimed is:

1. A fuel injection control apparatus for an internal combustion engine comprising:
   a fuel injection valve disposed on an intake port on the upstream side of an intake valve of said internal combustion engine;
   a detector that detects operating conditions of said internal combustion engine;
   a spray condition changing apparatus for changing a spray condition of said fuel injection valve; and
   a control unit that controls said spray condition changing apparatus based on said operating conditions,
   wherein said detector detects an engine temperature and an engine load as the operating conditions of said internal combustion engine,
   wherein said spray condition changing apparatus is an apparatus for changing an angle of spray of said fuel injection valve, and
   wherein said control unit:
      controls said spray condition changing apparatus to narrow the angle of spray, when said engine temperature is equal to or less than a predetermined temperature;
      controls said spray condition changing apparatus to widen the angle of spray, when said engine temperature exceeds said predetermined temperature and also said engine load is equal to or less than a predetermined load; and
      controls said spray condition changing apparatus to narrow the angle of spray, when said engine temperature exceeds said predetermined temperature and also said engine load exceeds said predetermined load.

2. A fuel injection control apparatus for an internal combustion engine comprising:
   a fuel injection valve disposed on an intake port on the upstream side of an intake valve of said internal combustion engine;
   a detector that detects operating conditions of said internal combustion engine;
   a spray condition changing apparatus for changing a spray condition of said fuel injection valve; and
   a control unit that controls said spray condition changing apparatus based on said operating conditions,
   wherein said detector detects an engine temperature and an engine load as the operating conditions of said internal combustion engine,
   wherein said spray condition changing apparatus is an apparatus for changing the spray condition to a condition where the spray of said fuel injection valve comes unevenly in contact with an exhaust side portion of a valve head of said intake valve, and to a condition where the spray of said fuel injection valve comes in contact with the valve head without biasing toward the exhaust side, and
   wherein said control unit:
      controls said spray condition changing apparatus to change the spray condition to the condition where the spray of said fuel injection valve comes in contact with the valve head without biasing toward the exhaust side, when said engine temperature is equal to or less than a predetermined temperature;
      controls said spray condition changing apparatus to change the spray condition to the condition where the spray of said fuel injection valve comes in contact with the valve head without biasing toward the exhaust side, when said engine temperature exceeds said predetermined temperature and also said engine load is equal to or less than a predetermined load; and
      controls said spray condition changing apparatus to change the spray condition to the condition where the spray of said fuel injection valve comes unevenly in contact with an exhaust side portion of the valve head of said intake valve, when said engine temperature exceeds said predetermined temperature and also said engine load exceeds said predetermined load.

3. A fuel injection control method of controlling the fuel injection by a fuel injection valve disposed on an intake port on the upstream side of an intake valve of said internal combustion engine, comprising the steps of:
   detecting operating conditions of said internal combustion engine; and changing a spray condition of said fuel injection valve based on said operating conditions, wherein said step of detecting the operating conditions detects an engine temperature, and wherein said step of changing the spray condition narrows an angle of spray of said fuel injection valve, when said engine temperature is equal to or less than a predetermined temperature.

4. A fuel injection control method of controlling the fuel injection by a fuel injection valve disposed on an intake port on the upstream side of an intake valve of said internal combustion engine, comprising the steps of:

detecting operating conditions of said internal combustion engine; and changing a spray condition of said fuel injection valve based on said operating conditions, wherein said step of detecting the operating conditions detects an engine temperature and an engine load, and wherein said step of changing the spray condition comprises the steps of:

narrowing an angle of spray, when said engine temperature is equal to or less than a predetermined temperature;

widening the angle of spray, when said engine temperature exceeds said predetermined temperature and also said engine load is equal to or less than a predetermined load; and narrowing the angle of spray, when said engine temperature exceeds said predetermined temperature and also said engine load exceeds said predetermined load.

5. A fuel injection control method of controlling the fuel injection by a fuel injection valve disposed on an intake port on the upstream side of an intake valve of said internal combustion engine, comprising the steps of:

detecting operating conditions of said internal combustion engine; and changing a spray condition of said fuel injection valve based on said operating conditions, wherein said step of detecting the operating conditions detects an engine load, and wherein said step of changing the spray condition changes a spray direction to a direction where the spray of said fuel injection valve comes unevenly in contact with an exhaust side portion of a valve head of said intake valve, when said engine load exceeds a predetermined load.

6. A fuel injection control method of controlling the fuel injection by a fuel injection valve disposed on an intake port on the upstream side of an intake valve of said internal combustion engine, comprising the steps of:

detecting operating conditions of said internal combustion engine; and changing a spray condition of said fuel injection valve based on said operating conditions, wherein said step of detecting the operating conditions detects an engine temperature and an engine load, and wherein said step of changing the spray condition comprises the steps of:

controlling a spray direction to a direction where the spray of said fuel injection valve comes in contact with a valve head without biasing toward the exhaust side, when said engine temperature is equal to or less than a predetermined temperature;

controlling said spray direction to the direction where the spray of said fuel injection valve comes in contact with the valve head without biasing toward the exhaust side, when said engine temperature exceeds said predetermined temperature and also said engine load is equal to or less than a predetermined load; and controlling said spray direction to a direction where the spray of said fuel injection valve comes in contact with an exhaust side portion of the valve head of said intake valve, when said engine temperature exceeds said predetermined temperature and also said engine load exceeds said predetermined load.

7. A fuel injection control apparatus for an internal combustion engine, comprising:

a fuel injection valve disposed on an intake port on the upstream side of an intake valve of said internal combustion engine; and a drift generating apparatus for selectively biasing the intake air flow in said intake port, to change a direction of the fuel spray injected from said fuel injection valve;

a detector detecting operation conditions of said internal combustion engine; and a control unit that controls said drift generating apparatus based on said operation conditions.

8. A fuel injection control apparatus for an internal combustion engine according to claim 7, wherein said drift generating apparatus is a valve opening or closing a part of an opening of said intake port.

9. A fuel injection control method of controlling the fuel injection by a fuel injection valve disposed on an intake port on the upstream side of an intake valve of said internal combustion engine, comprising the steps of:

detecting operating conditions of said internal combustion engine; and changing a spray condition of said fuel injection valve based on said operating conditions, wherein said step of detecting the operating conditions detects an engine temperature and an engine load, and wherein said step of changing the spray condition comprises the steps of:

controlling a spray direction to a direction where the spray of said fuel injection valve comes in contact with a valve head of said intake valve without biasing toward the exhaust side, and also narrowing the angle of spray of said fuel injection valve, when said engine temperature is equal to or less than a predetermined temperature;

controlling the spray direction to the direction where the spray of said fuel injection valve comes in contact with the valve head of said intake valve without biasing toward the exhaust side, and also widening the angle of spray of said fuel injection valve, when said engine temperature exceeds said predetermined temperature and also said engine load is equal to or less than a predetermined load; and controlling the spray direction to a direction where the spray of said fuel injection valve comes in contact with an exhaust side portion of the valve head of said intake valve, and also narrowing the angle of spray of said fuel injection valve, when said engine temperature exceeds said predetermined temperature and also said engine load exceeds said predetermined load.

10. A fuel injection control method for an internal combustion engine according to claim 9, further comprising the steps of:

controlling said fuel injection valve to perform the fuel injection during an intake stroke, when said engine temperature is equal to or less than said predetermined temperature;

controlling said fuel injection valve to perform the fuel injection during an exhaust stroke, when said engine temperature exceeds said predetermined temperature and said engine load is equal to or less said predetermined load; and controlling said fuel injection valve to perform the fuel injection during the intake stroke, when said engine temperature exceeds said predetermined temperature and said engine load exceeds said predetermined load.

11. A fuel injection control method for an internal combustion engine according to claim 9, further comprising the step of:

increasingly correcting a pressure of fuel supplied to said fuel injection valve, when said engine temperature is equal to or less than said predetermined temperature, and when said engine temperature exceeds said predetermined temperature and also said engine load exceeds said predetermined load.

12. A fuel injection control method for an internal combustion engine according to claim 9, further comprising the step of:

making fuel injected from said fuel injection valve collide with air, to atomize the fuel, when said engine temperature is equal to or less than said predetermined temperature, and when said engine temperature exceeds said predetermined temperature and also said engine load exceeds said predetermined load.

13. A fuel injection valve for an internal combustion engine, comprising:
a valve body;
a valve seat on which said valve body is seated;
a deforming member deforming itself to deform a fuel passage on the downstream side of said valve seat; and
a heater heating said deforming member.

14. A fuel injection valve for an internal combustion engine according to claim 13,
wherein a nozzle plate, on which a nozzle is opened, is disposed on the downstream side of said valve seat, and
wherein said deforming member deforms itself depending on a temperature, to change a position of said nozzle plate.

15. A fuel injection valve for an internal combustion engine according to claim 13, wherein said deforming member is a nozzle plate, on which a nozzle is opened, disposed on the downstream side of said valve seat, and said nozzle plate deforms itself depending on a temperature.

16. A fuel injection valve for an internal combustion engine according to claim 13, wherein an angle of spray is changed over due to the deformation of said deforming member by the ON/OFF of said heater.

17. A fuel injection control apparatus for an internal combustion engine comprising:
a fuel injection valve disposed on an intake port on the upstream side of an intake valve of said internal combustion engine;
a detector that detects operating conditions of said internal combustion engine;
a spray condition changing apparatus for changing a spray condition of said fuel injection valve; and
a control unit that controls said spray condition changing apparatus based on said operating conditions,
wherein said detector detects an engine temperature as the operating condition of said internal combustion engine,
said spray condition changing apparatus is an apparatus for changing an angle of spray of said fuel injection valve, and
said control unit controls said spray condition changing apparatus to narrow the angle of spray, when said engine temperature is equal to or less than a predetermined temperature.

18. A fuel injection control apparatus for an internal combustion engine according to claim 17,
wherein said spray condition changing apparatus comprises:
a deforming member which deforms itself depending on a temperature, to deform a fuel passage on the downstream side of a valve seat of said fuel injection valve; and
a heater heating said deforming member, and
wherein said control unit controls said heater, to change the angle of spray.

19. A fuel injection control apparatus for an internal combustion engine according to claim 18, wherein said deforming member is a nozzle plate, on which a nozzle is opened, disposed on the downstream side of the valve seat of said fuel injection valve.

20. A fuel injection control apparatus for an internal combustion engine according to claim 18,
wherein a nozzle plate, on which a nozzle is opened, is disposed on the downstream side of the valve seat of said fuel injection valve, and
wherein said deforming member deforms itself depending on the temperature, to change a position of said nozzle plate.

21. A fuel injection control apparatus for an internal combustion engine comprising:
a fuel injection valve disposed on an intake port on the upstream side of an intake valve of said internal combustion engine;
a detector that detects operating conditions of said internal combustion engine;
a spray condition changing apparatus for changing a spray condition of said fuel injection valve; and
a control unit that controls said spray condition changing apparatus based on said operating conditions,
wherein said detector detects an engine load as the operating condition of said internal combustion engine,
wherein said spray condition changing apparatus is an apparatus for changing the spray condition to a condition where the spray of said fuel injection valve comes unevenly in contact with an exhaust side portion of a valve head of said intake valve, and to a condition where the spray of said fuel injection valve comes in contact with the valve head without biasing toward the exhaust side, and
wherein said control unit controls said spray condition changing apparatus to let the spray of said fuel injection valve to unevenly come in contact with the exhaust side portion of the valve head of said intake valve, when said engine load exceeds a predetermined load.

22. A fuel injection control apparatus for an internal combustion engine according to claim 21, wherein said spray condition changing apparatus is a drift generating apparatus selectively biasing the intake air flow in said intake port, to change a direction of the fuel spray injected from said fuel injection valve.

23. A fuel injection control apparatus for an internal combustion engine according to claim 22, wherein said drift generating apparatus is a valve opening or closing a part of an opening of said intake port.

24. A fuel injection control apparatus for an internal combustion engine comprising:
- a fuel injection valve disposed on an intake port on the upstream side of an intake valve of said internal combustion engine;
- a detector that detects operating conditions of said internal combustion engine;
- a spray condition changing apparatus for changing a spray condition of said fuel injection valve; and
- a control unit that controls said spray condition changing apparatus based on said operating conditions,
- wherein said detector detects an engine temperature and an engine load as the operating conditions of said internal combustion engine,
- wherein said spray condition changing apparatus comprises:
  - an angle of spray changing apparatus for changing an angle of spray of said fuel injection valve; and
  - a spray direction changing apparatus for changing the spray condition to a condition where the spray of said fuel injection valve comes unevenly in contact with an exhaust side portion of a valve head of said intake valve, and to a condition where the spray of said fuel injection valve comes in contact with the valve head without biasing toward the exhaust side, and
- wherein said control unit:
  - controls said spray direction changing apparatus to change the spray condition to the condition where the spray of said fuel injection valve comes in contact with the valve head without biasing toward the exhaust side, and also controls said spray angle changing apparatus to narrow the angle of spray, when said engine temperature is equal to or less than a predetermined temperature;
  - controls said spray direction changing apparatus to change the spray condition to the condition where the spray of said fuel injection valve comes in contact with the valve head without biasing toward the exhaust side, and also controls said spray angle changing apparatus to widen the angle of spray, when said engine temperature exceeds said predetermined temperature and also said engine load is equal to or less than a predetermined load; and
  - controls said spray direction changing apparatus to change the spray condition to the condition where the spray of said fuel injection valve comes unevenly in contact with an exhaust side portion of the valve head of said intake valve, and also controls said spray angle changing apparatus to narrow the angle of spray, when said engine temperature exceeds said predetermined temperature and also said engine load exceeds said predetermined load.

25. A fuel injection control apparatus for an internal combustion engine according to claim 24, wherein said control unit:
- controls said fuel injection valve to perform the fuel injection during an intake stroke, when said engine temperature is equal to or less than said predetermined temperature;
- controls said fuel injection valve to perform the fuel injection during an exhaust stroke, when said engine temperature exceeds said predetermined temperature and also said engine load is equal to or less said predetermined load; and
- controls said fuel injection valve to perform the fuel injection during the intake stroke, when said engine temperature exceeds said predetermined temperature and also said engine load exceeds said predetermined load.

26. A fuel injection control apparatus for an internal combustion engine according to claim 24, further comprising:
- an atomization apparatus for atomizing the fuel spray injected from said fuel injection valve,
- wherein said control unit operates said atomization apparatus, when said engine temperature is equal to or less than said predetermined temperature, and when said engine temperature exceeds said predetermined temperature and also said engine load exceeds said predetermined load.

27. A fuel injection control apparatus for an internal combustion engine according to claim 26, wherein said atomization apparatus is an apparatus for increasing a pressure of fuel supplied to said fuel injection valve.

28. A fuel injection control apparatus for an internal combustion engine according to claim 26, wherein said atomization apparatus is an apparatus for making fuel injected from said fuel injection valve collide with air, to atomize the fuel.

* * * * *